April 24, 1956  T. R. SMITH  2,742,925
FLOW CONTROL VALVE
Original Filed June 10, 1950

INVENTOR.
Thomas R. Smith,
BY

United States Patent Office 2,742,925
Patented Apr. 24, 1956

2,742,925

FLOW CONTROL VALVE

Thomas R. Smith, Newton, Iowa, assignor to The Maytag Company, Newton, Iowa, a corporation of Delaware Original application June 10, 1950, Serial No. 167,283. Divided and this application October 23, 1951, Serial No. 252,598

1 Claim. (Cl. 138—45)

The present invention relates to fluid flow control devices, and more particularly to such devices for automatically supplying water having the desired temperature characteristics to washing machines and the like.

The present invention contemplates novel control devices for controlling the flow of fluid in a mixing valve such, for example, as would be used in an automatic washer wherein hot water and cold water are mixed to obtain warm water which is supplied to the automatic washing machine. Mixing valves employed at the present time for such use embody a thermostatic control and a flow control device on the outlet side thereof and are capable of delivering to the washing machine equal amounts of warm water in any given interval of time, regardless of variations in pressure of the entering water and at any desired temperature, for example at 100 degrees F. with a variation either way of approximately 5 degrees F., depending, of course, upon the type and setting of the thermostatic control. It has been found, however, that the temperature variation may exceed such limitations as above represented and that the temperature of the wash water may vary as much as 30 degress F. or, for example, between 90 and 120 degrees F. without affecting the washing operations and with such recognition it has been possible by relatively simple and inexpensive mechanism to effectively control the flow of water to deliver equal amounts thereof in equal intervals of time to the washing machine within the temperature range indicated, thus eliminating the necessity for the thermostatic control presently used in this type of mixing valves.

Accordingly the present invention has as an object the idea of providing a flow control device which is of simple, durable and relatively inexpensive construction, which is adapted for use in controlling the flow of fluid through a conduit or the like and which is adapted to deliver equal quantities of fluid in equal intervals of time, regardless of variations in pressure of the entering fluid.

Still another object of the present invention is to provide a mixing valve having the attributes of the mixing device described immediately hereinabove and adapted to regulate and control the hot, cold, and warm water delivered to an automatic washing machine or the like.

Other objects, features, capabilities and advantages are comprehended by the invention as will later appear and as are inherently possessed thereby.

Referring to the drawings.

Figure 1:
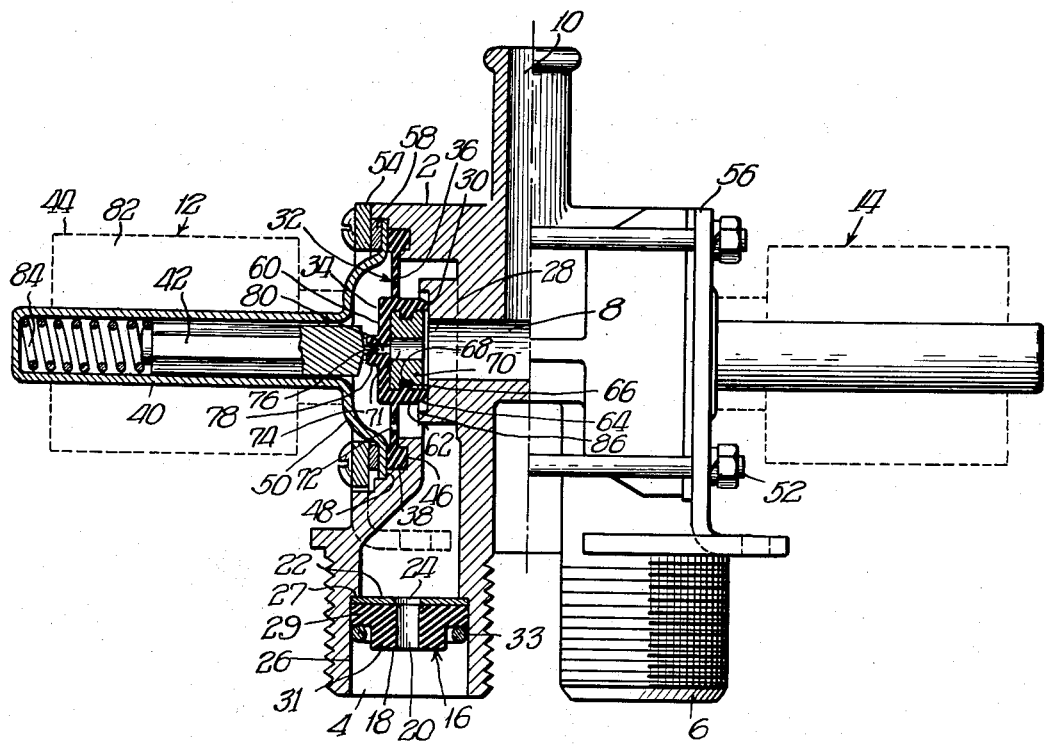
Figure 1 is a plan view of a valve assembly made in accordance with the present invention having parts thereof broken away and shown in cross-section to disclose the valve construction more in detail.
Figure 2:
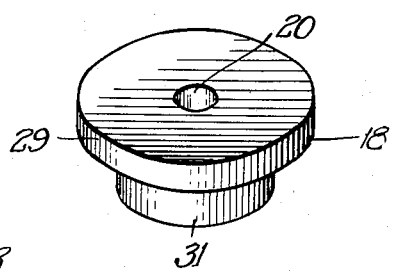
Figure 2 is a view in perspective of a member for the flow control devices incorporated in the valve assembly shown in Figure 1 of the drawings.
Figure 3:
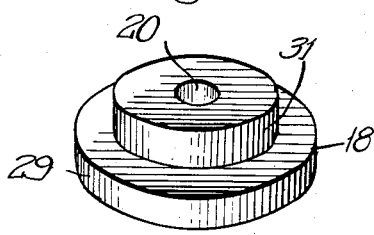
Figure 3 is another view in perspective of the member shown in Figure 2 of the drawings.

Referring now in more detail to the drawings, an embodiment selected to illustrate the present invention is shown as being incorporated in a mixing valve for use in supplying hot and cold water, or a mixture of the same, to the container or tub for a washing machine or the like, and more particularly, the said illustrative example of the invention contemplates the provision of means for automatically supplying such liquid to said tub or container.

In the form in which the invention is illustrated in the drawings, the valve comprises a valve body 2 having an inlet 4 adapted to be connected to a source of cold water and an inlet 6 adapted to be connected to a source of hot water. The inlets 4 and 6 communicate with a mixing chamber 8 in which hot and cold water are mixed in suitable proportions, as desired, and discharged through a single outlet 10 connected, as by means of a flexible hose or the like, to the tub or container of a washing machine or the like. Intermediate the inlets 4 and 6 and the outlet 10 are valve assemblies 12 and 14 for controlling the flow of hot and cold water into the mixing chamber 8 and thence through the outlet 10. It is, of course, understood that either of the valve assemblies 12 and 14 may be individually operated or operated simultaneously to selectively supply hot or cold, or a mixture of hot and cold, water through the outlet 10 to the washing tub or the like.

Mounted within each of the inlets 4 and 6 is a flow control device 16 for controlling the flow of water to the mixing chamber 8.

Inasmuch as the valve assemblies 12 and 14, as well as flow control devices 16, are of similar construction, reference will be hereinafter made to the details of such structure as is shown incorporated in the cold water side of the valve.

The present application is concerned primarily with the structure and operation of the flow control devices for controlling the flow of hot and cold water through the inlets 4 and 6 to the mixing chamber 8. Such a flow control device is disclosed as comprising a member 18 formed of resilient rubberlike material of the proper durometer hardness and having a centrally disposed orifice 20 extending therethrough. The flow control member 18 is mounted in the inlet 4 in abutting relation with a member 22 formed with a centrally disposed orifice 24 of slightly larger diameter than the diameter of the orifice 20. This abutment member 22 is substantially of the same diameter as the diameter of the enlarged section 26 of the inlet 4 and is disposed therein in abutting relation with the annular shoulder 27.

The member 18 is formed with an outer annular peripheral portion 29 of a size to comfortably fit in engaging relation with the inner wall of the enlarged section 26 of the inlet and a centrally disposed nose-like portion 31 which, as illustrated in the drawings, has the uniform bore 20 substantially centrally located therein. The nose-like portion in the illustrative example of the invention is cylindrical shaped and extends outwardly and laterally of the annular peripheral portion 29. The member 18 is held in position in abutting relation with the member 22 by means of an expansible spring ring 33 engaging the outer face of the peripheral portion 29 and the inner face of the enlarged section 26 of the inlet.

In accordance with the present disclosure, the member 18 has radially and axially extending surfaces facing the upstream side of the inlet. The radially extending surfaces are formed in part by the face of the annular peripheral portion 29 and in part by the end of the centrally disposed portion 31. The outer peripheral surface of the portion 31 constitutes the axially disposed surface for the flow control devices, the same being disposed radially inwardly and in spaced relation to the inner surface of the enlarged section 26 of the inlet.

The shape of the member 18 with its radially and axially extending surfaces permits fluid pressure on the upstream side of member 18 to be exerted on the side walls of the annular portion 31 so that as the pressure in the inlet 4 increases, the bore through annular portion 31 will be decreased in size to restrict the flow of liquid therethrough. The dimensions of the projecting nose-like portion, the durometer hardness of the resilient rubberlike material from which the member 18 is made, and the shape and size of the bore 20 are factors which determine the flow characteristics of the members 18. The size of the bore 20 varies inversely with the pressure in the system, and such variation serves in the capacity of controlling the flow of liquid, whereby equal amounts of liquid are passed through the orifice 20 in equal intervals of time. In the particular illustrated valve assembly for use in automatic washers, the members 18 are designed to deliver substantially equal amounts of water in equal intervals of time with pressure variations in the system of between 20 and 100 pounds per square inch.

The invention further contemplates the idea of having constant flow control devices in both the hot and cold water inlets, which may be designed or set so that equal amounts of both hot and cold water are discharged into the mixing chamber 8 in equal intervals of time, or the flow control devices in both the hot and cold water inlets may be so designed or set to provide constant flow controls with different flow values. This difference in flow values is of significance where it is desired to hold the warm water temperature at the higher or lower value than the straight mechanical mixing of equal quantities will give where the flow control devices have the same flow control characteristics.

A diaphragm valve assembly made according to the present disclosure has the additional advantage of being stable and positive in its operation. This is due to the fact that when the flow control devices are mounted in the inlet end of the valve, the flow control devices absorb the greater portion of the pressure drop so that the total pressure drop across the diaphragm type valve is relatively small which leads to a more stable and positive operation of the diaphragm type valve.

While the present application is directed particularly to the flow control devices as hereinabove described, nevertheless, the same are shown in connection with a valve assembly for supplying hot, cold, or warm water to an automatic washing machine or the like, and accordingly, the environment in which these devices operate and the manner in which the water is controlled in its flow to the washing machine will be more particularly described. It is understood, however, that the valve mechanisms with which the present flow control devices are used are merely illustrative and that the present invention contemplates the use of the flow control devices with various types of fluid control mechanisms.

Such valve assembly is constituted by a port 28 intermediate the inlet 4 and the mixing chamber 8, the same being provided with an annular valve seat 30 surrounding the same and adapted to be engaged in sealing relation by a flexible diaphragm 32 whereby the flow of liquid from the inlet 4 to the mixing chamber 8 is controlled. The flexible diaphragm member 32 is constructed of a flexible rubberlike material having a central portion 34, an intermediate annular web section 36 and an outer enlarged peripheral ring portion 38. The diaphragm 32 is mounted in the valve body 2 through the medium of its enlarged peripheral ring portion 38 by securing means including a housing 40 for the armature or plunger 42 of a solenoid 44. The enlarged peripheral ring portion 38 is seated within the annular groove 46 formed in the valve body 2 which is provided with an inner shoulder 48 for a purpose to be hereinafter described.

In the present illustrative embodiment of the invention, the housing 40 is formed with an annular flange 50 adapted to engage the enlarged peripheral ring portion 38 of the diaphragm and through the medium of the bolts, such as 52, the flange 50 compresses the enlarged peripheral ring portion 38 therebetween and the groove 46 to provide a solid anchor for holding and centering the diaphragm in operative position, and which compression of the ring portion causes the same to act as a self-sealing gasket for forming a fluid-tight joint between the valve body 2 and the annular flange 50 of the housing 40. The clamping and securing means further includes the bracket members 54 and 56 which, through the medium of a gasket, such as 58, causes the housing structure 50 to be brought down into compressing relation with the enlarged peripheral ring portion 38, the amount of compression being limited by the engagement of the annular flange 50 with the shoulder 48 so as not to unduly compress the ring portion 38 and to cause damage thereto. The brackets 54 and 56 are provided with suitable means whereby the valve may be mounted in any desired manner to frame structure of a washing machine or the like.

The central portion 34 comprises a central web 60 and a laterally or outwardly extending annular sealing lip 62 having its outer marginal edge curved, as at 64, to provide streamlined characteristics to improve the flow characteristics of liquid through the valve. The annular sealing lip 62, when the valve assembly is in its closed position, is adapted to engage the seat 30 to cut off the flow of liquid through the valve. The sealing lip 62 is further provided with an inwardly and radially extending annular ring 66 integrally formed therewith and adapted to engage within the groove 68 formed in the outer peripheral surface of a seal stop 70 to hold the same in assembled relation with the diaphragm 32. This seal stop which is made of metal, or other relatively rigid material, is provided with a central opening 71 extending therethrough and terminates short of and in spaced relation to the outer end 64 of the sealing lip 62 and may be snapped into place by flexing the sealing lip 62. This stop member 70 provides a positive stop for the closing movement of the diaphragm in its sealing position and also serves as a reinforcing member for the central portion of the diaphragm about the opening 80 and the sealing lip 62. It will be clearly apparent that movement of the sealing lip 62 is limited by the engagement of the stop member 70 with the seat 30 to prevent undue compression of the sealing lip 62.

The diaphragm 32 has a small orifice or opening 72 in the intermediate annular web section 36 which is in communication at all times with the high pressure side of the inlet 4 and the control chamber 74 formed between the diaphragm 32 and the housing structure 40. The plunger 42, which has heretofore been described as a part of the solenoid 44, also constitutes a valve member of a pilot valve for controlling the opening and closing of the diaphragm 32. The plunger 42 is provided with the conically shaped end piece 76 which seats with the sealing lip 78 extending outwardly of the central web 60, and which defines an opening 80 of greater cross-sectional area than the orifice 72 concentrically disposed in alignment with the opening 71 of the stop 70 and extending through said central web 60. The solenoid 44 further includes a conventional field winding 82 embracing the housing 40 which is energized from any suitable source of electricity for retracting the armature or plunger 42 from its engagement with the lip 78 when it is desired to actuate the valve mechanism. The solenoid 44 may be controlled electrically by any sequence timer, if so desired. Interposed between the end of the plunger 42 and the outer end of the housing 40 is a coil spring 84 for returning the plunger to its seating relation with the sealing lip 78 upon deenergization of the winding 82.

In order to reduce turbulence in the flow of liquid from the inlet 4 to the mixing chamber 8, an annular raised rim 86 is provided around the outer periphery of the valve seat in spaced relation to the sealing lip 62 of the diaphragm. It has been found that in the absence of such annular rim liquid acting upon one side of the sealing portion of the diaphragm causes the same to vibrate which results in surging of the liquid through the valve. By providing the annular rim, however, relative smooth and uniform flow of liquid through the valve assembly is facilitated without objectionable disturbances.

In the operation of the valve made in accordance with the present invention, the high pressure side thereof is connected through the inlet 4 to a suitable source of supply for cold water. With the valve parts in the position as shown in Figure 1 of the drawings, the water will flow through the diaphragm aperture 72 into the diaphragm or control chamber 74 until the same is filled. Inasmuch as there is little or no pressure on the outlet side of the valve, the fluid pressure in the chamber 74 holds the diaphragm 32 in seating relation with the valve seat 30. When the solenoid 44 is energized by passing current through the solenoid field winding 82, the armature or plunger 42 will be moved outwardly against the compressive action of the spring 84 so as to unseat the same with the pilot valve opening 80. As soon as this unseating of the pilot valve member 42 with the pilot valve opening 80 takes place, the fluid under pressure in the chamber 74 flows out through the pilot valve opening 80 and into the low side of the valve into the mixing chamber 8.

As the fluid pressure is relieved in the control or diaphragm chamber 74 due to the flow of fluid out of the chamber through the opening 80 at a greater rate than it enters through the orifice 72, the fluid pressure on the inlet side of the valve is effective on the underside of the flexible diaphragm to force or flex the same outwardly away from its seating position on the seat 30 to permit flow of fluid from the inlet 4 through the port 28 to the mixing chamber 8, and thence through the outlet 10 into the washing tub or the like. So long as the solenoid 44 is energized the diaphragm 32 will remain in its open position to permit flow of fluid in the manner indicated. When the solenoid 44 is deenergized, however, the plunger 42, under the action of the spring 84, is moved into its seating relation with the pilot valve opening 80 whereby fluid pressure is built up in the diaphragm chamber 74 from the high side of the valve through the opening 72 to maintain the diaphragm in its closed and seating relation with the valve seat 30. This sealing relation of the diaphragm with respect to the valve seat is maintained inasmuch as the total area on the outer side of the diaphragm, namely, that area exposed to fluid pressure within the control chamber 74, is greater than the area on the innerside of the diaphragm.

It will be clearly apparent that the operation of the valve through the solenoid, which in turn may be electrically controlled by a sequence timer, is merely illustrative of one way in which the valve may be operated. It will also be apparent that in accordance with the present disclosure, the solenoids for the hot and cold water supply can be operated either individually or simultaneously, depending upon whether it is desired to introduce hot, cold, or a mixture of hot and cold water to the washing machine or the like.

This application is a division of application Serial No. 167,283, filed June 10, 1950, now Patent No. 2,644,476, issued July 7, 1953, for Flow Control Valve to Thomas R. Smith. Said Patent No. 2,644,476 was reissued on July 5, 1955, as Reissue No. 24,034.

While I have herein described and upon the drawings shown an illustrated embodiment of the invention, it is to be understood that the invention is not to be limited thereto, but may comprehend other constructions, arrangements of parts, details, and features without departing from the spirit of the invention.

I claim:

A fluid control device including a conduit for fluid flow therethrough; a shoulder within said conduit; a flow control member of resilient material within said conduit, said flow control member including a cylindrical base portion seated, at its down-stream end, on said shoulder, and a coaxial cylindrical end portion of constant normal diameter on the up-stream side of said base portion, said end portion having a substantially smaller external diameter than said base portion and being substantially spaced throughout its periphery from the internal wall of the conduit; a normally uniform, centrally located, constantly open bore extending centrally through said base and end portions, and forming with said end portion a readily deformable, annular wall; said annular wall being adapted to contract at its upstream end upon an increase of fluid pressure within said conduit to decrease the size of said bore within said annular wall to maintain a substantially constant volume of flow throughout a wide range of pressures.

References Cited in the file of this patent

UNITED STATES PATENTS

| | | |
|---|---|---|
| 657,007 | Richter | Aug. 28, 1900 |
| 2,132,148 | Davis | Oct. 4, 1938 |
| 2,319,498 | Gerard | May 18, 1943 |
| 2,389,134 | Brown | Nov. 20, 1945 |
| 2,510,414 | Philbrick | June 6, 1950 |
| 2,568,519 | Smith | Sept. 18, 1951 |
| 2,572,244 | Chace | Oct. 23, 1951 |
| 2,644,476 | Smith | July 7, 1953 |

FOREIGN PATENTS

| | | |
|---|---|---|
| 154,109 | Switzerland | July 1, 1932 |